United States Patent Office 3,335,077
Patented Aug. 8, 1967

3,335,077
PREPARATION OF ALDEHYDE BASED COPOLYMERS USING IONIZING RADIATION
Claude Chachaty, Paris, France, assignor to Houilleres du Bassin du Nord et du Pas-de-Calais, Douai, France
No Drawing. Filed May 31, 1961, Ser. No. 131,032
Claims priority, application France, May 31, 1960, 828,654
9 Claims. (Cl. 204—159.4)

This invention relates to methods of preparing aldehyde base polymers by irradiation of aldehyde monomers at low temperature. Methods of this type are known and result in the production of polymers having advantageous properties. However, such processes have heretofore been limited to the homopolymerization of single monomers such as formaldehyde or acetaldehyde. When formaldehyde monomer is used, the resulting polymers appear as very hard, rigid solids, whereas the homopolymers resulting from acetaldehyde are elastomeric in character.

The homopolymers heretofore produced by such methods, while possessing certain desirable properties, have been limited in their usefulness.

The present invention is based on the unexpected discovery that the copolymerization of formaldehyde with at least one further aldehyde by irradiation in liquid phase and at low temperature (less than 0° C. and preferably about −80° C.) makes it possible to obtain polymerization rates very much higher (for a given dose of irradiation) than those obtained when operating by homopolymerization from a single monomer, and, moreover, yields novel copolymer products which have unexpected and desirable characteristics differing substantially from the characteristics of the polymer products that would be respectively obtained by operating under similar conditions with each of the constituent monomers alone.

Specifically, it has been found that using low radiation doses such that, when applied to a liquid acetaldehyde monomer, very low yields of polyacetaldehyde would be obtained in the form of a rubbery but sticky ("tacky") solid, a similar radiation dose applied to the copolymerization of formaldehyde with acetaldehyde according to the invention, yields clear, flexible, elastic products with a conversion yield factor of 100%.

The invention therefore is primarily directed to a method of preparing novel copolymers of formaldehyde with at least one further aldehyde, which method comprises exposing a mixture of the formaldehyde and further aldehyde to ionizing radiation in vacuo at low temperature, e.g. at about −80° C. The invention also comprises the novel copolymer porducts obtained by said method. The novel copolymers are generally clear, glassy flexible, elastic solids.

As stated one of the monomers used in the copolymerization method of the invention necessarily is formaldehyde. The other monomeric constituent may be any of various aldehydes, preferably though not necessarily an aldehyde that is liquid at a temperature of about −80° C. However, in case the further aldehyde component is solid at this temperature, the process of the invention can be performed by forming a solution or suspension of the solid aldehyde in a liquid carrier; this carrier may be formaldehyde.

The aldehydes susceptible of copolymerization with formaldehyde according to the invention include especially though not exhaustively the lower aliphatic aldehydes such as acetaldehyde, butyraldehyde, and propionaldehyde; acrolein, and the like.

The following examples will serve to illustrate the high versatility of the invention but should not be interpreted as restricting its scope.

EXAMPLE 1

*Copolymerization of formaldehyde with acetaldehyde*

A mixture is prepared from 6 cc. of high-purity acetaldehyde (distilled over calcium) and 2 cc. formaldehyde. The mixture, weighing 7 grams, is placed in a sealed evacuated glass phial at −80° C. and is irradiated for 19 hours at a rate of 12.5 roentgen/minute, to obtain a total radiation dose of approximately 14,000 roentgens. There are thus obtained 7 grams of a flexible, elastic, clear colorless solid without any residual liquid in the phial, showing that the copolymerization was effected with a conversion yield factor of 100%.

EXAMPLE 2

Repeating the procedure of Example 1 with a mixture of equal volumes of formaldehyde and acetaldehyde and a total radiation dose of 12,400 roentgens, a solid copolymer is obtained which is similar to that in Example 1, without any residual liquid, and again with a conversion yield of about 100%.

Samples of the products obtained in Examples 1 and 2 were subjected to mechanical tests with the following results: Elongation at yield point 400%; Young's modulus 750 g./sq. mm. The products therefore are shown to be true elastomers. They are satisfactory in aspect and to the touch.

If formaldehyde alone is polymerized under conditions similar to those described in Examples 1 and 2, it produces a rigid, very hard solid homopolymer. Again, acetaldehyde alone when polymerized under similar conditions is homopolymerized with a yield not exceeding 20% and yields a rubbery, but tacky, product. Moreover, homopolymerized polyacetaldehyde even with high molecular mass remains comparatively less stable than the copolymers produced in Examples 1 and 2. Thus in the absence of any depolymerization inhibitor such as phenols or aromatic amines, polyacetaldehyde begins to break down rapidly at about 60° C. and is thoroughly degraded at the end of a few days even at ordinary temperature. On the other hand, the addition of formaldehyde in amounts greater than 10% by weight to the polymerization medium according to the invention is conducive to substantially more stable copolymers. Their rate of breakdown at ordinary temperature is negligibly low and becomes observable only at temperatures above 130° C. Moreover the copolymers retain their rigid character over long periods of time whereas acetaldehyde homopolymers soften rapidly by breakdown in the presence of air.

A physical characterization of the copolymer products obtained in Examples 1 and 2 was effected as follows:

(a) *Infra-red spectrum*: The infra-red spectra of the above copolymers were compared respectively with the spectra of homopolymers and of mixtures of the homopolymers. It was found that the copolymer spectrum shows an absorption band at 11.45$\mu$ and that this band does not occur in either polyformaldehyde or in polyacetaldehyde. The spectra of these respective substances exhibit absorption bands at 8.05$\mu$ and 11.75$\mu$. The spectra of various mixtures of the homopolymers also show these two bands.

(b) *X-ray diffraction patterns*: The patterns show that the crystallinity of the products decreases as the acetaldehyde content therein increases. The line corresponding to a mesh spacing of 7.25 A. which characterizes polyacetaldehyde homopolymers does not occur with the copolymers of the invention.

(c) *Melting point*: The melting point of the copolymers of the invention varies with the proportion of acetaldehyde present in the monomer mix, and is in all cases lower than the melting point of polyformaldehyde which is 175–180° C. Thus the following melting points were noted:

| Percent acetaldehyde | 10 | 15 | 40 | 75 |
|---|---|---|---|---|
| Percent formaldehyde | 90 | 85 | 60 | 25 |
| Melting point, °C | 164 | 128 | 110 | 133 |

(d) *Solubility*: The copolymers of the invention having an acetaldehyde content higher than about 50% in weight are soluble in the usual solvents of polyacetaldehydes, such as chloroform, methylethylketone, ethyl acetate and the like. Those having a formaldehyde content higher than 50% are only swollen in such solvents, but do dissolve in hot pyridine whereas polyformaldehyde is insoluble in the latter solvent.

EXAMPLE 3

*Copolymerization of formaldehyde with propionaldehyde*

20 grams are prepared of a mixture of 10 grams formaldehyde with 10 g. propionaldehyde. The mixture is irradiated in an inert atmosphere at −80° C. for 20 hours at a rate of 12.5 r./mn., to obtain a total radiation dose of 15,000 r. After evaporation, 1.2 grams of a copolymer containing 20% combined propional are collected. This copolymer is a clear glassy solid, odorless after being washed with ether, melting at 154–160° C. The melting point value confirms the fact that a novel compound is involved since polyformaldehyde melts at 180° C.

EXAMPLE 4

The procedure of Example 3 is repeated in vacuo, using a much stronger radiation source having a rate of 3,000 r./mn. and a much higher total radiation dose of 200,000 r. There are obtained 7 g. of a solid containing 30% combined propionaldehyde, a clear glassy solid melting at 140–150° C.

It should be noted that propionaldehyde alone polymerizes with great difficulty. It is seen therefore that the presence of an equivalent quantity of formaldehyde has had the unexpected result of causing the propionaldehyde to participate in the polymerization. The resulting copolymer has a lower melting point than that of formaldehyde homopolymer. The presence of polypropionaldehyde molecules in the copolymer is also found to modify the mechanical characteristics of the product. Thus whereas polyformaldehyde polymer is so rigid and hard as to be practically unbreakable, the copolymer obtained by the method of the invention is easily crushed and ground.

In the foregoing examples the propionaldehyde monomer can be replaced with butyraldehyde to provide advantageous copolymer products having characteristics separate and distinct from those of the monomer ingredients. In particular the melting points of the copolymer products of the invention can be adjusted over a wide range to suit a wide diversity of applications. Other modifications and departures from the procedures and ingredients specifically mentioned herein may be resorted to within the scope of the invention.

What I claim is:

1. The method of preparing novel copolymer products which comprises exposing a mixture of formaldehyde monomer and at least one other aldehyde monomer selected from the group consisting of acetaldehyde, propionaldehyde and butyraldehyde to ionizing irradiation in vacuo at a temperature lower than 0° C.

2. The method of claim 1 wherein said temperature is about −80° C.

3. The method of claim 1 wherein said other aldehyde monomer is liquid at the temperature used.

4. The method of claim 1 wherein said other aldehyde monomer is solid at the temperature used and is applied in dispersion in a liquid.

5. The method of claim 4 wherein said liquid is formaldehyde.

6. The method of claim 1 wherein said other aldehyde comprises acetaldehyde.

7. The method of claim 1 wherein said other aldehyde comprises propionaldehyde.

8. The method of claim 1 wherein said other aldehyde comprises butyraldehyde.

9. The method of preparing a copolymer which comprises exposing a mixture of formaldehyde monomer and acetaldehyde monomer to ionizing radiation in vacuo at a temperature lower than 0° C.

References Cited

UNITED STATES PATENTS

| 2,734,889 | 2/1956 | Starr | 260—67 |
|---|---|---|---|
| 2,902,470 | 9/1959 | Kress | 260—67 |
| 2,947,675 | 8/1960 | Maisel et al. | 204—159.22 |
| 2,964,455 | 12/1960 | Graham | 204—159.14 |
| 3,005,799 | 10/1961 | Wagner | 260—67 |
| 3,093,560 | 6/1963 | Fourcade | 204—159.21 |
| 3,107,208 | 10/1963 | Chachaty | 204—159.21 |

FOREIGN PATENTS 349,556   5/1931   Great Britain.

OTHER REFERENCES

McLennan et al.: Canadian Journal of Research, 1931, pp. 470–81.

SAMUEL H. BLECH, *Primary Examiner.*

MURRAY TILLMAN, *Examiner.*

N. F. OBLON, R. B. TURER, *Assistant Examiners.*